UNITED STATES PATENT OFFICE
PTO – BOYERS, PA DUTY STATION

---

PAGE NOT AVAILABLE

PATENT NUMBER X6210 FOR THE ISSUE DATE 5/20/1834 HAS BEEN SCANNED/LOADED, BUT WITH MISSING PAGE(S). UPON RECEIPT OF THE MISSING PAGE(S), THE ENTIRE DOCUMENT WILL BE RESCANNED. THIS NOTICE IS FOR THE MISSING PAGE CONTAINING:

Missing ALL Drawings

DATA CONVERSION OPERATION
BOYERS, PA

Daniel Poole

The schedule referred to in these Letters Patent and making part of the same containing a description in the words of the said Daniel Poole himself of his improvement in the machine for rolling and cutting crackers

---

The first consists of a frame standing on four posts, the frame may be about six feet long and the width agreeable to the number of cutters should be put in the machine, the height from three to four feet, the posts at one end of the machine which is called the head, extend up from two to three feet above the sides of said frame, where the slide works, in that the cutters are attached to, these posts are on a pitch of about fifteen degrees, There are two rollers hung in two short posts back of the other head posts, one roller above the other, which roll the dough, this dough is brought on by an apron, this apron gets its motion by means of two small rollers one of them let into the sides close to the rollers that roll the dough, and the other at the back end, this apron is about four feet long and receives its motion from the rollers that roll the dough by means of bands and small pulleys, the dough passes through the rollers on a platform of lead where the cutters cut the crackers, this platform of lead is level with the lower roller that rolls the dough, there is another apron that takes the crackers from this platform which is about three feet long and is carried by rollers, the same as the other apron and gets its motion from the rollers that roll the dough in the same way as the other apron, the cutters are put on a plate 1p X8210 5-20-1834 plate in a slide similar to a saw gate which works up
and down in these posts at the head, the cutters get
their motion from a shaft which passes thro' under the
platform with the cranks at each end & pitman to con-
nect the cranks and slide together, the rollers get their
motion from this pitman by having two pulleys put on
at each end of the upper roller that rolls the dough
with cogs on them and bands round them, which
work loose and a catch on one side of the bands which
catch in these cogs, there is a handle on one side of these
bands which runs out to the pitman and is connected to
them and when the cutters raise it gives motion to
the rollers and when the cutters go down the rollers
stand still, these cutters may be put on brass or any
other metalic substance in one two or three rows to=
gather in any number from one to fifty or more.
the punches for these cutters are screwed in through the
plate any number may be put in, there are small
plates put in for clearers and get their motion by hav-
ing two small wires rivetted in each side of the plate
and passes thro' the plate that the cutters are placed into
[illegible] which fixed in by means of small knives, this
[illegible] each end when the cutters go down just
[illegible] in to cut and draws the clearers up in-
[illegible] cutters, and when the cutters raise, the clearers
[illegible] come out by means of a spring and clear the crackers
[illegible] out. the name is put in the centre of the cutter and
[illegible] pass up through the plate & small burrs on the up-
[illegible] per side. this name has no motion but is put in per-
[illegible] manent Witnesses
John C. Weinman
William Milnor Daniel Poole [illegible]